(12) United States Patent
Kaneda

(10) Patent No.: US 6,625,194 B1
(45) Date of Patent: Sep. 23, 2003

(54) LASER BEAM GENERATION APPARATUS

(75) Inventor: Yushi Kaneda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/336,061

(22) Filed: Jun. 18, 1999

(30) Foreign Application Priority Data

Jun. 26, 1998 (JP) .......................................... P10-180584

(51) Int. Cl.[7] .............................. H01S 3/91; H01S 3/92
(52) U.S. Cl. ............................ 372/71; 372/69; 372/70; 372/75
(58) Field of Search .......................... 372/69, 70, 71, 372/75, 3, 11

(56) References Cited

U.S. PATENT DOCUMENTS 4,922,495 A * 5/1990 Bobbs et al. ................... 372/3
5,867,324 A * 2/1999 Kmetec et al. ................ 372/71
5,991,315 A * 11/1999 Injeyan et al. ................ 372/11
6,094,297 A * 7/2000 Injeyan et al. ................ 372/71

* cited by examiner

*Primary Examiner*—Paul Ip
*Assistant Examiner*—Cornelius H. Jackson
(74) *Attorney, Agent, or Firm*—Oblon, Spivak, McClelland, Maier & Neustadt, P.C.

(57) ABSTRACT

A laser beam generation apparatus includes a solid state laser medium having first and second optically polished planes provided opposed with each other to allow a laser beam to be pumped to pass out of one of the first and second optically polished planes. At least one third optical polished plane which is different from the first and second optically polished planes is also provided. A pumping beam source emits a pumping light beam to pump the laser medium and impinges the pumping light source to be incident on the at least one third optically polished plane. Further, the pumping laser beam is provided at an incident angle substantially equal to the Brewster angle.

19 Claims, 3 Drawing Sheets

LASER BEAM GENERATION APPARATUS

BACKGROUND OF THE INVENTION

1. Field of the Invention

The present invention relates to a laser beam generation apparatus to be used, for example, for a laser processing apparatus, semiconductor device inspection apparatus, interference meter, particle counter and laser display unit or the like.

2. Description of the Related Art

Research and development have been conducted widely for a laser light source to be used for a laser processing apparatus, semiconductor device inspection apparatus and others. A laser beam generation apparatus to be used for the above apparatuses can be classified into a side pumping system and end pumping system. The former is mainly used for a high output laser providing an average output of 10 W or more, while the latter for a laser providing an average output of 1 W or less. These systems respectively have the characteristics of the possibility for improvement in scale for higher output and good efficiency.

However these systems respectively have the advantages not competing with each other from the technical viewpoint but on the other hand have respective disadvantages.

For example, in the case of the side pumping system, draining of heat is difficult due to its lower efficiency and moreover an AR (No-reflection) coating is required for the plane of incidence for the laser medium pumping light beam.

In addition, the end pumping system has a problem that the surface of the laser medium requires a complicated coating and a structure of resonator is also restricted for the focusing of pumping light beam in order to satisfy a couple of performances that the pumping light beam is transmitted while the laser beam is reflected.

Problems of the related systems explained above will then be explained in detail. A single stripe semiconductor laser (manufactured by Polaroid Inc., USA) which is currently available provides the maximum output of 4 W and light emission width of 200 $\mu$m (a Sony product assures light emission width of 300 $\mu$m or 2 to 4 W/200 $\mu$m and higher output will be expected in the future from narrower light emission width).

However, when a semiconductor laser oscillating near 809 nm and providing an output of 3 W is used for the end pumping system of Nd:YAG laser, an output of 1 W or more and 1064 nm can be obtained. In an experiment, an output of 1.3 W and 1064 nm can be obtained from the incident pumping beam power of 2.5 W. Namely, this output has been obtained through the process that an output beam of the semiconductor laser is collimated by a lens, the beam is then shaped with anamorphic prisms, the beam is then focused to generate a spot of 200 $\mu$m in diameter within a laser medium and thereby good overlapping is realized with the resonator TEM00 mode in diameter of about 300 $\mu$m. However, since the pumping light beam is incident via one end mirror forming a resonator in the end pumping system, there are problems that the laser medium must be provided near the end mirror and the end mirror itself must have higher transmissivity for the pumping light beam and requires at its rear surface the non-reflection coating for the pumping light beam.

Meanwhile, various examples have been proposed for the side pumping system and each example respectively introduces a structure that a semiconductor laser called a bar type or a semiconductor laser joined to a fiber are used and the pumping laser beam is incident in a vertical direction to the laser medium.

However, in the case of the Nd:YAG laser, if the no-reflection coating is not utilized, the Fresnel reflection loss becomes about 10% and the pumping light beam is not incident to the laser medium effectively. Moreover, the semiconductor laser explained above is often used when it has an output of several watts or more.

For realization of a laser actually providing an output of 1 to 2 W, the semiconductor laser of the bar type as explained above is not preferable from the viewpoint of the draining of heat. A bar type semiconductor laser has an output as high as 20 W but its power consumption is also as high as 40 to 60 W. When the laser is operated at a low output condition by reducing a current value, heat generated by the threshold value current reaching about 20 W must be eliminated, and therefore a cooling means such as a water cooling device is essential.

In more practical applications, for realization of output up to 1 to 2 W, it is more practical to use a semiconductor laser having an output of 3 to 4 W and it is advantageous from the viewpoint of draining of heat. These semiconductor lasers typically generate light beams assuring the light emission width of 200 to 300 $\mu$m and low condensation property in the multiple mode in a width direction.

On the other hand, the light emitting area in the direction vertical to such a width direction is about 1 $\mu$m and output light beam is the beam at the diffraction limitation having good condensation property. Therefore, when the output beam of these are collimated and condensed with an ordinary lens, such a flat beam as focusing the light emitting area in the light emission width direction and condensing in the vertical direction to such width direction can be obtained. Polarization of the output beam of the broad area semiconductor laser is parallel to the light emission width direction.

SUMMARY OF THE INVENTION

The present invention has been proposed considering the background explained above and it is therefore an object of the present invention to provide a laser beam generation apparatus including a solid state laser medium having a set of optically polished planes provided opposed with each other for allowing the laser beam to be pumped to pass and at least one optically polished plane different from above planes and a pumping beam source for emitting a pumping light beam for pumping the laser medium, whereby the pumping light beam to be incident from at least one optically polished plane different from a set of optically polished planes allowing the laser beam to be pumped to pass is incident to the laser medium in the incident angle equal to or similar to the Brewster angle.

According to one aspect of the present invention, the pumping light is an output light beam of a broad area semiconductor laser and the output light beam of broad area semiconductor laser is focused, using a focusing means of a lens and/or reflecting mirror, to the area near at least one optically polished plane which is different from an optically polished plane provided opposed with each other allowing the laser beam to be pumped to pass in the longitudinal direction of the light emitting aperture of the broad area semiconductor laser and is also condensed within the laser medium in the direction almost vertical to the longitudinal direction.

Moreover a first reflecting means reflects at least a part of the laser beam to be pumped which is incident to the laser medium to the laser medium in the reflection angle equal to or similar to the Brewster angle from the opposing plane which is almost parallel to the plane where the pumping light beam is incident and is optically polished and a second reflecting means for inputting again, in the reflection angle equal to or similar to the Brewster angle, at least a part of the pumping light beam reflected by the first reflecting means from the plane where the pumping light beam of the laser medium is incident are also comprised.

DETAILED DESCRIPTION OF THE PREFERRED EMBODIMENTS

Figure 1A:
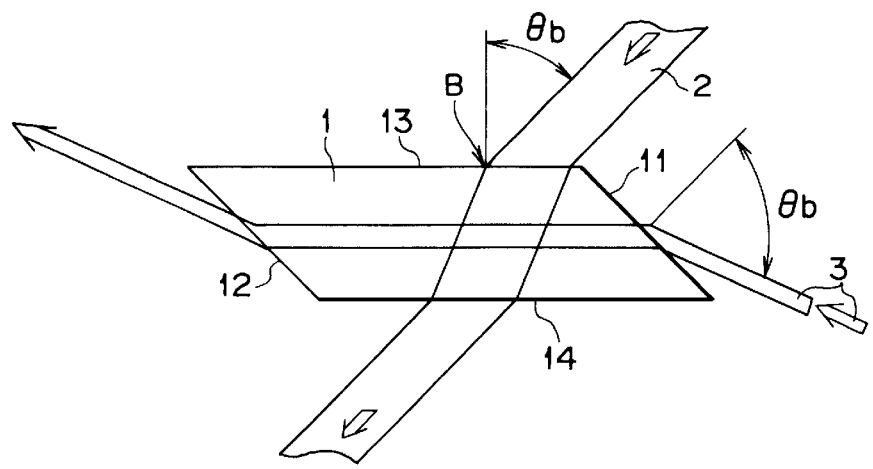
FIG. 1A is a schematic diagram of a laser source illustrating an embodiment of the present invention and FIG. 1B is an enlarged diagram of the part B of FIG. 1A.

In the present invention, it is preferable to form a solid state laser including a solid state laser medium including a set of optically polished planes provided opposed with each other allowing the laser beam to be pumped to pass and at least one optically polished plane different therefrom and a pumping light source including linear polarization so that the pumping light beam which is to be incident from the plane different from a set of optical planes provided opposed with each other allowing the laser beam to be pumped to pass is incident to the laser medium in the incident angle equal to or similar to the Brewster angle.

Moreover, the pumping light beam may be a laser beam emitted from a semiconductor laser including the linear polarization.

In this case, a semiconductor laser is a broad area semiconductor laser and it is also preferable that the junction plane of the semiconductor laser is within the plane of incident of the laser medium.

Moreover, it is preferable to use a focusing means of a lens and/or reflecting mirror for inputting the pumping light beam to the laser medium.

Further, it is also preferable that an output beam of the broad area semiconductor laser is almost focused in the longitudinal direction of a light emitting section with a certain spread within the incident plane to the laser medium and then focused within the laser medium in the direction vertical to such longitudinal direction by using a focusing means of a lens and/or reflecting mirror.

Furthermore, it is also preferable to provide a reflecting means for reflecting, within the laser medium, at least a part of the pumping light beam which is incident to the laser medium in the reflection angle equal to or similar to the Brewster angle from the opposing plane which is parallel to the plane of incident and is optically polished.

In this case, the reflecting means may be formed by a metal material or by evaporating a metal material on the glass substrate or may be formed as a film coated on the optically polished laser medium.

Moreover, it is also preferable to provide a second reflecting means for inputting again, into the laser medium, at least a part of the pumping light beam reflected by the reflecting means explained above from the plane of incident to the laser medium in the reflection angle equal to or similar to the Brewster angle.

In this case, the second reflecting means may be formed by a metal material or by evaporating a metal material on the optically polished glass substrate or may be a film coated on the optically polished laser medium.

When the pumping light beam is reflected within the laser medium by the reflecting means and is then emitted from the incident plane explained above, it is also preferable that a thickness of the laser medium and width of the pumping laser beam are adjusted so that the pumping light beam does not overlap with the incident pumping light beam.

In addition, it is preferable that the laser medium has a length less than the absorption length of the pumping laser beam in the direction vertical to the propagating direction of the laser beam to be pumped within the plane of incidence of the pumping light beam.

Moreover, it is preferable that the laser beam to be pumped has a diameter, within the laser medium, which is ⅓ to ½ the size of the laser medium in the direction of plane of incidence of the pumping laser beam.

Further, it is also preferable that the laser beam to be pumped has a diameter, in the direction vertical to the plane of incidence of the pumping light beam, which is smaller than that in the direction parallel to such plane of incidence.

Furthermore, it is preferable that the plane of incidence and/or plane of emission to/from the laser medium of the laser beam to be pumped is provided adjacent to the plane of incidence of the pumping light beam, the laser beam to be pumped is incident to the laser medium in the angle equal to or similar to the Brewster angle and the beam diameter is expanded in the direction of plane of incidence.

In this case, it is also preferable that the laser beam to be pumped has the angle equal to or similar to the Brewster angle for the incident direction of the pumping laser beam.

In addition, it is preferable that at least one of the laser medium surfaces provided opposed with each other not transmitting the laser beam to be pumped and pumping laser beam within the laser medium is closely mounted on a mount to accelerate draining of heat generated in the laser medium.

In this case, the mount is provided on an electronic cooling element under the control of temperature as well as draining of heat.

The preferred embodiments of the present invention will be explained.

FIG. 1A illustrates a first embodiment of the present invention. Numeral 1 designates a laser (gain) medium to or from which the laser beam to be pumped (hereinafter referred only as laser beam) 3 is incident or emitted from the surfaces (planes) 11 and 12 which are optically polished and are parallel to each other. The pumping laser beam 2 is incident to the laser medium 1 from the optically polished surface 13 in the particular angle θ equal to or similar to the Brewster angle. After the beam is absorbed, the remaining pumping light beam not absorbed is then emitted from the surface 14 parallel to the surface 13.

Although each surface (plane) is optically polished, the surfaces 11 and 12 among these surfaces are required to have the fine surface accuracy (about λ/10) in order to transmit the laser beam. Moreover, it is preferable that the surfaces 13 and 14 are mutually parallel but these are not restricted thereto.

In the present invention, a laser source is not particularly designated for the laser beam 3 but an output of a semiconductor laser, for example, is preferable.

Moreover, the material of laser medium 1 is well known such as those including, for example, rare earth ion such as neodimium ion or yttrium ion, namely, any one of Nd:YAG, Nd:YVO$_4$, Nd:YLF, Nd:Glass, Yb:YAG are preferable.

Moreover, there is no restriction for the output source of pumping light beam 2, but usually an output of the laser source is used and an output light beam of a semiconductor laser, for example, is preferable. Moreover, the pumping light beam including the linear polarization is preferable. When considering these conditions, an output light beam of a semiconductor laser including the linear polarization, particularly an output light beam of a broad area semiconductor laser including the linear polarization is more preferable. The beam for coupling the light emitting area to laser medium of such output light beam is referred to as a "sheet beam" and its flat direction is within the paper surface in FIG. 1.

The present invention introduces the so-called oblique pumping system and the pumping light beam 2 is incident to the surface 13 in the particular angle μb, namely the angle equal to or similar to the Brewster angle for refraction absorption in the laser medium 1. A degree of absorption changes depending on the kinds of laser medium or the like. When the Nd:YAG laser medium is considered, for example, this laser medium has a typical absorption coefficient of 5 to 6 cm$^-$ for the pumping light beam and about 40 to 60% of the pumping light beam is absorbed in the thickness of about 1 to 2 mm.

Figure 1B:
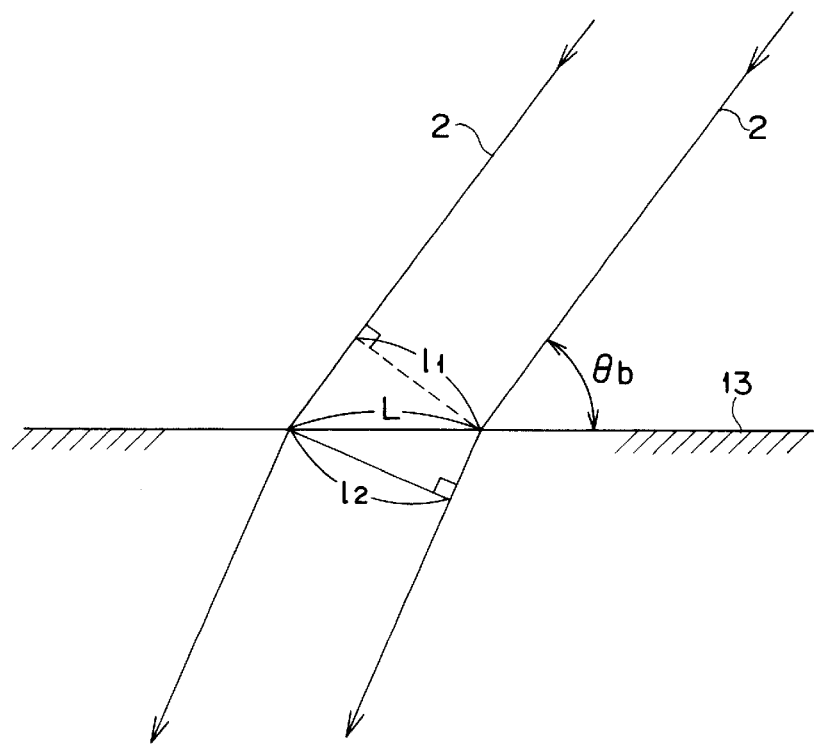

Incident condition of pumping light beam 2 is illustrated in detail in FIG. 1B. When the pumping light beam is incident in the incident angle of μb, a flat spot of beam is formed on the surface 13. Diameter L of this spot is larger than the distance 11 in the width direction of the beam. Namely, the irradiation area of the beam 2 becomes larger than that in the case of right angle incidence. Therefore, the beam diameter 12 of the pumping light beam becomes large as much as refraction index within the laser medium and reflection loss of the pumping light beam can be lowered compared to the case of right angle incidence. However, sagittal direction of the pumping light beam is limited only to the narrow area at the diffraction limitation.

It is not preferable that the angle of incidence μb is outside of the angle equal to or similar to the Brewster angle because the pumping light beam is never incident to the laser medium and is never absorbed therein effectively.

Since the pumping light beam is incident to the laser medium without passing a mirror of resonator in the present invention, the mirror of resonator is not required to transmit the pumping light beam and the non-reflection coating for the pumping light beam at the rear surface is not required. In addition, no coating is required for the laser medium. Even when the laser beam to be pumped is incident to the laser medium in the angle near to the right angle, it is enough that the non-reflection coating is applied only to the laser beam and there is no requirement for transmissivity in regard to the pumping light beam.

Moreover, since the oblique pumping system is employed, the laser medium is never required to be arranged near the mirror of resonator and thereby the degree of freedom for design of the resonator can also be increased. In addition, since an anamorphic prism for shaping an output beam of the semiconductor laser to be excited is unnecessary, therefore condensation of the light beam can be realized even with an ordinary lens (glass mold, non-spherical) without using a cylindrical lens even in the experimental scale.

In the structure illustrated in FIG. 1, the laser beam 3 is also incident to the laser medium 1 in the angle equal to or similar to the Brewster angle but it is also possible to cause the laser beam 3 to be incident to the non-reflection coated surface of the laser medium 1. However, it is advantageous in relation to the mode selection property explained later to cause the laser beam 3 to be incident to the laser medium 1 in the angle equal to or similar to the Brewster angle.

Here, oscillation of the laser resonator in the fundamental traverse lateral mode, TEM00 mode is necessary to obtain an output beam at the diffraction limitation and oscillation mode selection property is essential.

Selection of traverse mode is mainly performed on the basis of two kinds of mechanisms. In one mechanism, the high order lateral mode is controlled by an aperture and in the other mechanism, only the basic mode is effectively excited depending on the space distribution of gain (excitation density).

In the case of the compact size resonator resulting in the resonator length from several millimeters to several tens of millimeters, the usual resonator mode size is 1 mm or less in the Gaussian radius and it is 0.5 mm or less in many cases.

In order to realize the effective laser oscillation, the resonator basic mode occupying the greater part of the area to be excited is required. However, the resonator parameters (radius of curvature of mirror, interval) must be set near to the values making the resonator unstable in order to obtain a comparatively large resonator mode even only at the part of the laser medium with the compact resonator. As a result, the allowable range becomes narrow and manufacture is always accompanied by difficulty.

When the laser beam is incident in the incident angle of μb to the laser medium, the beam diameter of the laser beam is increased as much as the refractive index in the laser medium and it becomes 1.82 times in the case of the Nd:YAG laser medium.

Accordingly, it is effective to particularly set the incident angle of the laser beam to the Brewster angle for obtaining a comparatively large resonator natural mode in the laser medium and for eliminating non-reflection coating to reduce the reflection loss.

For example, the resonator natural mode near to 0.5 mm in terms of the Gaussian radius can also be obtained even with the compact resonator. Here, when the width of the laser medium is about 1.5 mm, the high order traverse mode is defined exceeding the length of the laser medium and thereby oscillation can be controlled. In this case, the laser medium itself is considered as an aperture.

On the other hand, even when the laser beam is incident in the incident angle of μb, the beam diameter is never expanded in the direction vertical to the plane of incidence, namely to the sagittal direction. As is already explained above, the sagittal direction of the pumping light beam is limited only to the narrow area and therefore it can more easily be reduced than the resonator natural mode.

As will be apparent from the above explanation, it is now possible to realize a laser beam generation apparatus which oscillates in the fundamental traverse mode of the resonator.

Up to now, it has been attempted to make large the overlapping area of the pumping area and laser beam by passing the laser beam in zigzag within the laser medium. In this case, requirement for polishing accuracy (parallelism, surface roughness) of total reflecting surface of the laser medium has been very severe.

In the present invention, since the surfaces 13 and 14 are provided only to pass the pumping light beam 2 with a low loss, requirement for surface accuracy is rather low and thereby the manufacturing cost can also be lowered.

In the example explained above, the remaining beam not absorbed of the pumping light beam is emitted from the plane (surface) 14, but since this surface is parallel to the surface 13, it is emitted in the angle similar to the Brewster angle with almost no emission loss. The optical surfaces 11 and 13 are required to have higher surface accuracy (about $\mu/10$) in order to transmit the laser beam.

Figure 2:
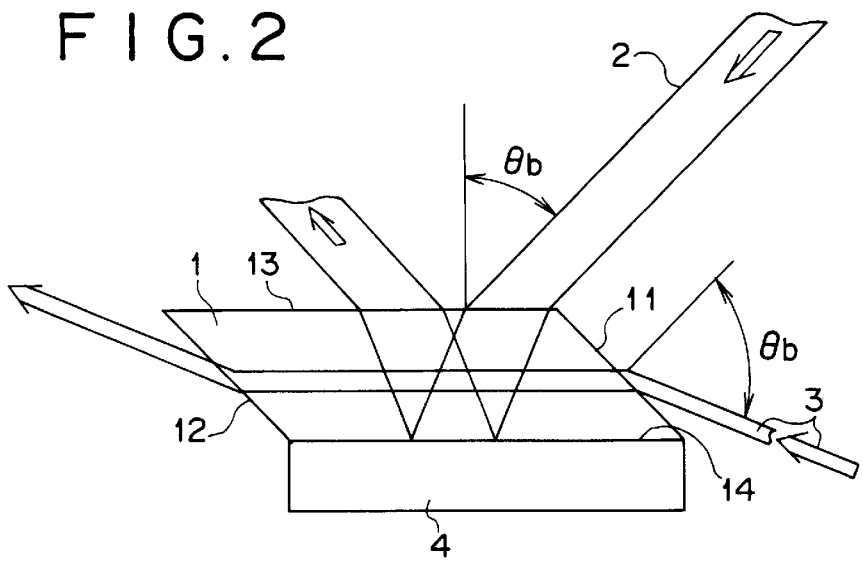
FIG. 2 is a schematic diagram of a laser source illustrating a second embodiment of the present invention.

Next, another embodiment will then be explained with reference to FIG. 2. Namely, a reflector 4 is arranged at the outside of the surface 14.

If the reflector 4 is not utilized, the surfaces 13 and 14 are formed in parallel and the pumping light beam is emitted without any reflection loss from the surface 14 almost in the Brewster angle. But, the reflector 4 reflects the remaining pumping light beam 2 not absorbed in order to pass again the laser medium 1, resulting in improvement of absorption efficiency.

As the reflector 4, any one may be selected from the polished metal material, polished glass material evaporated by gold and laser medium in which metal material is evaporated in direct on the surface 14.

Among the reflectors listed above, the reflector obtained by evaporating gold on the glass substrate assures lower manufacturing cost and easily realizes the reflectivity of 98% or more.

Figure 3:
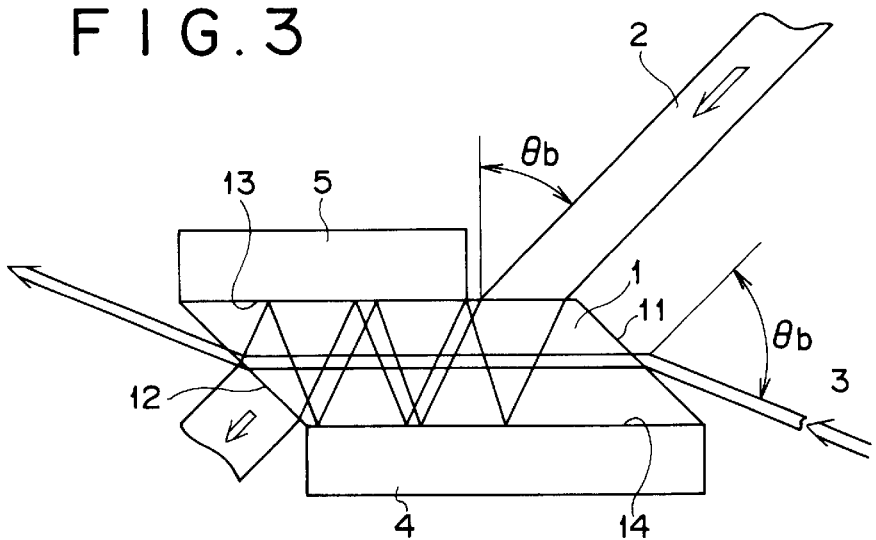
FIG. 3 is a schematic diagram of a laser source illustrating a third embodiment of the present invention.

In addition, in the embodiment illustrated in FIG. 3, the laser beam passes at least twice through the laser medium 1 but it is still remained non-absorbed and thereby the pumping light beam 2 to be emitted from the optical surface 13 is caused to travel with a multiple path in the laser medium 1 with the reflector 5 like the reflector 4 explained above. In this case, it is essential that the reflector 5 does not block the pumping light beam 2. Moreover, since the emitting position of the pumping light beam which is returned to the optical surface 13 after going up and down the laser medium is determined by the Brewster angle and width of laser medium, the width of the incident pumping light beam is set narrow so that it does not overlap with the pumping light beam.

As explained above, the pumping light beam which repeats reflection between a couple of reflectors 4 and 5 is propagated for a comparatively longer distance in the laser medium. It means that the pumping light beam can be absorbed effectively even when the absorption coefficient of the pumping light beam is rather small. Since the absorption coefficient is a function of wavelength to a large extent, the absorption coefficient of the pumping light beam is also a function of temperature of the semiconductor laser. Since the absorption coefficient of the pumping light beam may be raised by the multiple paths, a merit that the allowable range of temperature of the semiconductor laser beam is widened can be realized. Moreover, this embodiment also provides a merit that the allowable range of the semiconductor process to determine the wavelength of the semiconductor laser may be widened and manufacturing yield can also be improved.

Figure 4:
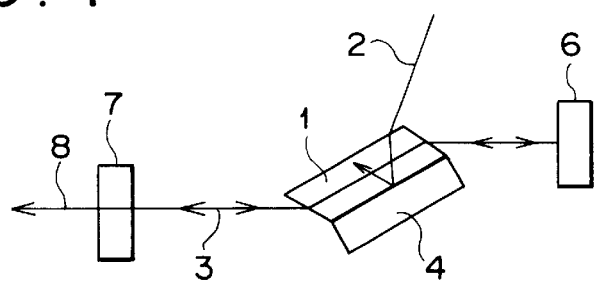
FIG. 4 is a schematic diagram of a laser source illustrating a fourth embodiment of the present invention.

Meanwhile, in the embodiment illustrated in FIG. 4, a laser medium 1 is provided between a laser mirror 6 and an output coupling mirror 7. This embodiment is rather inferior to the end pumping system in the space overlapping of the pumping light beam 2 and laser beam 3 but assures the oscillation coefficient of 60% or more.

In this case, the laser beam 3 is amplified in the laser medium 1 to be excited by the pumping laser beam 2 while it goes up and down within the resonator. The remaining portion not absorbed of the pumping light beam 2 is transmitted through the double-path within the laser medium by the reflector 4 and is effectively absorbed in the laser medium.

Since the oblique pumping system is employed in the present invention unlike the end pumping system and side pumping system, there is no limitation that the laser medium must be located near the end mirror or folded mirror of the resonator.

Figure 5:
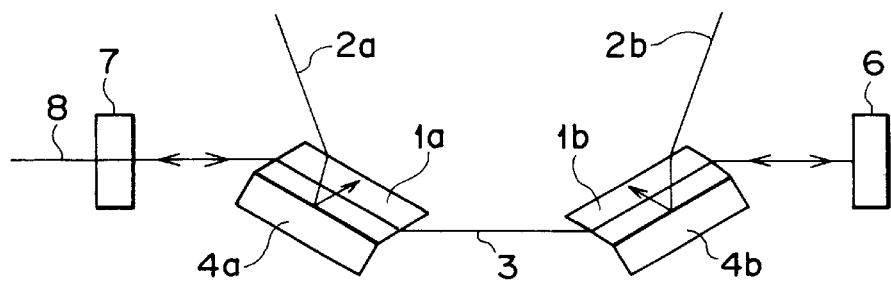
FIG. 5 is a schematic diagram of a laser source illustrating a fifth embodiment of the present invention.

Therefore, like an example illustrated in FIG. 5, a couple of laser media 1a, 1b are arranged between the laser mirror 6 and output coupling mirror 7. Thereby, a simply formed resonator can provide a higher output with a tandem type power scaling.

The laser media 1a and 1b are excited respectively by the pumping light beams 2a and 2b. This pumping light beam is then reflected by the reflectors 4b and 4b to improve the absorption efficiency thereof. Although not illustrated in the figure, it is also possible to realize highly efficient absorption with multiple paths of the pumping light beam by providing the reflectors 5a and 5b.

The laser beam 3 is in the natural mode of the resonator of laser mirror 3 and output coupling mirror 7 and is then emitted as the laser output 8 from the output coupling mirror 7.

Figure 6:
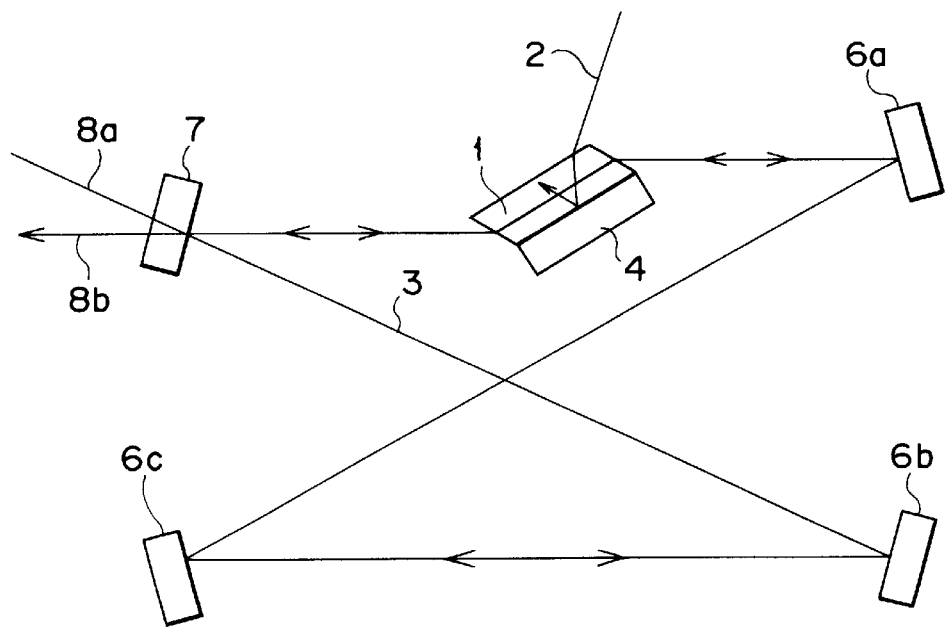
FIG. 6 is a schematic diagram of a laser source illustrating a sixth embodiment of the present invention.

Or, as illustrated in FIG. 6, the laser medium 1 can easily be arranged in a ring type resonator and it is effective to realize a simplified laser source. The laser resonator is composed of laser mirrors 6a to 6c and output/input coupling mirror 7 to emit the output light beam 8b. In this case, it is also possible to use an incident light 8a from the external side in order to realize optical coherence.

In any example, it is also possible to arrange a non-linear optical element such as BBO, LBO, KTP, PPLN within the laser resonator to effectively generate optical second harmonics.

Owing to the examples explained above, a laser source which can provide a higher optical output can be realized with a fewer number of parts.

According to the present invention, since the oblique pumping system is employed in which the pumping light beam is incident to the laser medium in the particular incident angle equal to or similar to the Brewster angle, the optical coating which has been required in the related art is no longer required and the pumping laser beam can be absorbed by the laser medium without any reflection loss. Moreover, the laser medium is also not required to be arranged near the mirror of resonator and thereby a degree of freedom for design of the resonator can be much improved to a higher value.

Moreover, when reflectors are provided, the pumping light beam can be effectively returned in the laser medium and multiple paths can be realized without any optical feedback to the pumping light beam and an allowable width of the wavelength of the pumping light beam can be widened. Moreover, since the optical feedback is not conducted, there is provided a merit that damage can be prevented so long as the pumping light beam is an output beam of the semiconductor laser. In addition, good overlapping with the TEM00 mode of the resonator can be obtained when the light beam is spread within the plane of incidence to the laser medium and it is then focused in the sagittal direction.

According to the present invention, there is provided a simply structured laser beam generation apparatus in the output power from several hundreds milliwatt to several watt realized with a fewer number of parts.

What is claimed is:

1. A laser beam generation apparatus comprising:
   a polyhedron-shaped solid state laser medium having first and second optically polished surfaces of the polyhedron provided opposed with each other for allowing a laser beam to be pumped to pass out of one of said first and second optically polished surfaces;
   at least one third optically polished surface of the polyhedron different from said first and second optically polished surfaces of the polyhedron; and
   a pumping beam source for emitting a pumping light beam for pumping said laser medium, and for impinging said pumping light beam to be incident on said at least one third optically polished surface at an incident angle substantially equal to the Brewster angle.

2. A laser beam generation apparatus claimed in claim 1, wherein said pumping light beam is a substantially linearly polarized light beam.

3. A laser beam generation apparatus claimed in claim 2, wherein said laser beam is an output light beam of a semiconductor laser including a substantially linearly polarized light beam.

4. A laser beam generation apparatus claimed in claim 3, wherein said semiconductor laser is a broad area semiconductor laser.

5. A laser beam generation apparatus claimed in claim 3, wherein a junction surface of said semiconductor laser is substantially parallel to a surface of incidence of said pumping light beam to said laser medium.

6. A laser beam generation apparatus claimed in claim 1, further comprising a focusing means including at least one of a lens and a reflection mirror to cause said pumping light beam to be incident to said laser medium.

7. A laser beam generation apparatus claimed in claim 1, wherein said pumping beam source is a broad area semiconductor laser and further comprising a focusing means including at least one of a lens and a reflecting mirror to focus said pumping beam onto said at least one third optically polished surface to allow said laser beam to be pumped to pass in a longitudinal direction of a light emitting aperture of said broad area semiconductor laser, and to be condensed within said laser medium in a direction substantially vertical to said longitudinal direction.

8. A laser beam generation apparatus claimed in claim 1, further comprising a first reflecting means for reflecting at least a part of said pumping light beam which is incident to said laser medium at a reflection angle substantially equal to the Brewster angle.

9. A laser beam generation apparatus claimed in claim 8, wherein said first reflecting means is composed of a metal material.

10. A laser beam generation apparatus claimed in claim 8, wherein said first reflecting means is formed by evaporating a metal material on a substrate of optically polished glass.

11. A laser beam generation apparatus claimed in claim 8, wherein said first reflecting means is a film coated on said optically polished laser medium.

12. A laser beam generation apparatus claimed in claim 8, further comprising a second reflecting means for reflecting at least a part of said pumping light beam reflected by said first reflecting means.

13. A laser beam generation apparatus claimed in claim 12, where said second reflecting means is composed of a metal material.

14. A laser beam generation apparatus claimed in claim 12, wherein said second reflecting means is formed by evaporating a metal material on an optically polished glass substrate.

15. A laser beam generation apparatus claimed in claim 12, wherein said second reflecting means is a film coated on said optically polished laser medium.

16. A laser beam generation apparatus claimed in claim 8, wherein a thickness of said laser medium and a beam width of the pumping light beam are selected so that the pumping light beam which is reflected to said laser medium from said first reflecting means and is emitted from the surface to which said pumping light beam is incident is not overlapped with said incident pumping light beam.

17. A laser bean generation apparatus claimed in claim 1, wherein said laser medium has a length less than an absorption length of said pumping light beam in a direction vertical to a propagating direction of said laser beam to be pumped within a surface of incidence of said pumping light beam.

18. A laser beam generation apparatus claimed in claim 1, wherein a surface of said laser medium which does not allow said laser beam to be pumped and said pumping light beam to pass is mounted on a mount to accelerate draining of heat of said laser beam.

19. A laser beam generation apparatus claimed in claim 18, wherein said mount is provided on an electronic cooling element under temperature control.

* * * * *